United States Patent [19]

Kuwayama et al.

[11] Patent Number: 5,031,480
[45] Date of Patent: Jul. 16, 1991

[54] HYDRAULIC CONTROLLER FOR AN AUTOMATIC TRANSMISSION

[75] Inventors: Yoshinari Kuwayama; Masahiko Ando; Yoichi Hayakawa, all of Aichi, Japan

[73] Assignee: Aisin AW Kabushiki Kaisha, Japan

[21] Appl. No.: 544,394

[22] Filed: Jun. 27, 1990

[30] Foreign Application Priority Data

Jun. 29, 1989 [JP] Japan .................................. 1-167517

[51] Int. Cl.$^5$ .............................................. B60K 41/18
[52] U.S. Cl. ........................................ 74/867; 74/866
[58] Field of Search .................................... 74/866, 867

[56] References Cited

U.S. PATENT DOCUMENTS 3,818,783  6/1974  Norris et al. ..................... 74/867 X
4,637,281  1/1987  Vanselous ......................... 74/867 X Primary Examiner—Dirk Wright
Attorney, Agent, or Firm—Lorusso & Loud

[57] ABSTRACT

An automatic transmission hydraulic controller having a multiplicity of hydraulic servos for respectively controlling a multiplicity of frictional engagement elements. A hydraulic pressure to be supplied to the hydraulic servos is applied to accumulator chambers of a multiplicity of accumulators. A line pressure to be supplied to the hydraulic servos is produced by a primary regulator valve and an engine output pressure control valve is controlled by an electrical signal from a control section to produce a hydraulic pressure corresponding to the engine output. Each of at least two particular ones of the multiplicity of accumulators has a back pressure chamber formed at the rear of a piston. The pressure receiving area of this back pressure chamber and that of the corresponding accumulator chamber are substantially equal to each other. Only one of the frictional engagement elements operated by the hydraulic servos communicating with the particular accumulators is changed over from a released state to an engaged state while the other frictional engagement elements are not changed over from a released state to an engaged state, when the transmission is shifted to a predetermined speed. There is no substantial influence of a change in the line pressure upon the operating state of the other frictional engagement elements.

3 Claims, 7 Drawing Sheets

|  |  | SOLENOID | | | CLUTCH | | | | BRAKE | | O.W.C | |
|---|---|---|---|---|---|---|---|---|---|---|---|---|
|  |  | SL1 | SL2 | SL3 | C0 | C1 | C2 | C3 | B1 | B2 | F0 | F1 |
| P |  | × | × | × | × | × | × | × | × | × | × | × |
| R | V≦7 | × | × | × | × | × | ○ | × | × | ○ | × | × |
|   | V>7 | ○ | × | × | × | × | ○ | × | × | × | × | × |
| N |  | × | × | × | × | × | × | × | × | × | × | × |
| D | 1ST | ○ | × | × | × | ○ | × | × | × | × | ○ | ○ |
|   | 2ND | ○ | ○ | ◎ | × | ○ | × | × | ○ | × | ○ | × |
|   | 3RD | × | ○ | ◎ | ○ | ○ | × | ○ | ◎ | × | ○ | × |
|   | 4TH | × | × | ◎ | ○ | ○ | × | × | ○ | × | × | × |
| 3 | 1ST | ○ | × | × | × | ○ | × | × | × | × | ○ | ○ |
|   | 2ND | ○ | ○ | ◎ | × | ○ | × | × | ○ | × | ○ | × |
|   | 3RD | × | ○ | ◎ | ○ | ○ | × | ○ | ◎ | × | ○ | × |
|   | (3RD) | × | × | × | ○ | ○ | × | ○ | ◎ | × | ○ | × |
| 2 | 1ST | ○ | × | × | × | ○ | × | ○ | × | × | ○ | ○ |
|   | 2ND | ○ | ○ | ◎ | × | ○ | × | ○ | ○ | × | ○ | × |
|   | 3RD | × | ○ | ◎ | ○ | ○ | × | ○ | ◎ | × | ○ | × |
|   | (3RD) | × | × | × | ○ | ○ | × | ○ | ◎ | × | ○ | × |
| 1 | 1ST | ○ | × | × | × | ○ | × | ○ | × | ○ | ○ | ○ |
|   | 2ND | ○ | ○ | × | × | ○ | × | ○ | ○ | × | ○ | × |
|   | (2RD) | × | ○ | × | × | ○ | × | ○ | ○ | × | ○ | × |
|   | (1ST) | × | × | × | × | ○ | × | ○ | × | ○ | ○ | ○ |

| SYMBOLS | ○ | ON | ENGAGED | LOCKED |
|---|---|---|---|---|
|  | × | OFF | RELEASED | FREE |
|  | ◎ | ON: L-UP ON / OFF: L-UP OFF | BRAKE B1 RELEASED BY B1 RELEASE PRESSURE | |

FIG. 3

HYDRAULIC CONTROLLER FOR AN AUTOMATIC TRANSMISSION

BACKGROUND OF THE INVENTION

This invention relates generally to automatic transmissions mounted on motor vehicles and, more particularly, to an automatic transmission capable of being suitably mounted on a front engine front drive type small vehicle which requires a reduction in the size of the transmission. More specifically, the present invention relates to a controller for controlling back pressures in accumulators.

Conventionally, in an ordinary hydraulic controller for automatic transmissions, accumulators are provided in association with hydraulic servos for operating clutches and brakes, and pressure for engaging each of the clutches and the like is applied according to the accumulator characteristics in order to reduce shift shocks.

In each of particular accumulators, a back pressure chamber is formed at the rear of the piston by being defined with a stepped portion. Also, an accumulator valve controlled on the basis of a throttle pressure is provided to regulate a line pressure and to supply the regulated hydraulic pressure to the back pressure chambers of the accumulators to further reduce the intensity of a shift shock caused when the throttle opening is small.

Also, an arrangement, such as the one disclosed in Japanese Laid-Open Patent No. 61-130653, is known in which a special solenoid valve controlled on the basis of a signal from a throttle opening sensor may be provided to control an accumulator control valve for the same use.

In automatic transmission hydraulic controllers having the above construction, however, the accumulator control valve controlled on the basis of the throttle pressure regulates the line pressure and supplies the regulated pressure to the accumulator back pressure chambers, and it is therefore necessary to form the back pressure chambers with stepped portions having much smaller pressure receiving area than that of the accumulator chamber. It is also necessary to form the respective back pressure chambers defined by stepped portions into different shapes according to the engaging characteristics of the clutches or brakes.

In the case of the accumulator control valve controlled by means of a solenoid valve, the back pressure chambers are also supplied with a hydraulic pressure obtained by regulating a line pressure in the same manner, and it is necessary to form the back pressure chambers with stepped portions. Also, since the special solenoid valve is required for the accumulator control valve, the cost of the transmission is increased.

Where either accumulator control valve is used, the back pressures in the accumulators are controlled through a hydraulic pressure based on a line pressure, and back pressure chambers formed with stepped portions are therefore required. Accordingly, the length of the piston of each accumulator is increased. Also, it is necessary for each accumulator to have a specific shape according to the characteristics of the corresponding clutch or brake; it is difficult to determine a common shape for all the accumulators. These conditions make it difficult to reduce the size of each accumulator which occupies a substantially large space in the valve body and, hence, to mount the transmission on a small motor vehicle.

SUMMARY OF THE INVENTION

It is an object of the present invention to provide an automatic transmission hydraulic controller which is free from the problems of the conventional hydraulic controllers for automatic transmissions, which is arranged to supply a hydraulic pressure to the back pressure chambers on the basis of a pressure such as a throttle pressure corresponding to the engine output and to make the pressure receiving area of the back pressure chambers equal to that of the accumulator chamber, and which thereby enables a reduction in the size of each accumulator and improves the performance of mounting on a vehicle.

According to the present invention, there is provided an automatic transmission hydraulic controller having a multiplicity of frictional engagement elements for engagement between predetermined elements of a shift gear mechanism; a multiplicity of hydraulic servos for respectively controlling the frictional engagement elements; a multiplicity of accumulators having accumulator chambers which communicate with the hydraulic servos and to which a hydraulic pressure supplied to the hydraulic servos is applied; a primary regulator valve for producing a line pressure supplied to the hydraulic servos; and an engine output pressure control valve for producing a hydraulic pressure corresponding to an engine output.

The engine output pressure control valve comprises a valve which is controlled by an electrical signal supplied from a control section. Each of at least two particular ones of the multiplicity of accumulators has a back pressure chamber formed at the rear of a piston. The pressure receiving area of this back pressure chamber and that of the corresponding accumulator chamber are substantially equal to each other. Only one of the frictional engagement elements operated by the hydraulic servos communicating with the particular accumulators is changed over from a released state to an engaged state while the other frictional engagement elements are not changed over from a released state to a engaged state, when the transmission is shifted to a predetermined speed.

In this arrangement, an engine output pressure supplied from the engine output pressure control valve is supplied to the accumulator back pressure chambers while being regulated by an accumulator control valve. A line pressure is thereby applied to the accumulator chamber of the accumulator communicating with the hydraulic servo operating the frictional engagement element which is to be changed over, while a hydraulic pressure based on the engine output pressure is applied to the back pressure chamber having the almost same pressure receiving area as the accumulator chamber, thereby smoothly engaging the frictional engagement element.

The engine output pressure control valve controlled by an electrical signal from the control section effects suitable pressure regulation according to the engaging characteristics of the frictional engagement element to be changed over, and supplies the regulated hydraulic pressure to the back pressure chamber, thereby smoothly engaging the frictional engagement element.

When the engine output pressure control valve effect pressure regulation, the primary regulator valve is also controlled and the line pressure is thereby changed. At this time, however, the other frictional engagement elements are not changed over to an engaged state. That is, the operating state of the other frictional engagement elements is not influenced by a change in the line pressure.

The engine output pressure control valve is a throttle pressure control valve comprising a linear solenoid valve which controls the primary regulator valve to produce the line pressure and controls the hydraulic pressure supplied to the back pressure chambers.

The hydraulic controller also includes the accumulator control valve having an input port, a feedback port and a pressure regulation port. A throttle pressure is supplied from the throttle control valve to the input port, and a hydraulic pressure produced by reducing the throttle pressure by a predetermined rate is output through the pressure regulation port to be supplied to the back pressure chambers of the accumulators.

Other features and details of the structure of the automatic transmission hydraulic controller in accordance with the present invention will become apparent upon reading the following description with reference to the accompanying drawings

BRIEF DESCRIPTION OF THE DRAWINGS

FIG. 3 is a diagram of the operation of the transmission;

DESCRIPTION OF THE PREFERRED EMBODIMENTS

Figure 2:
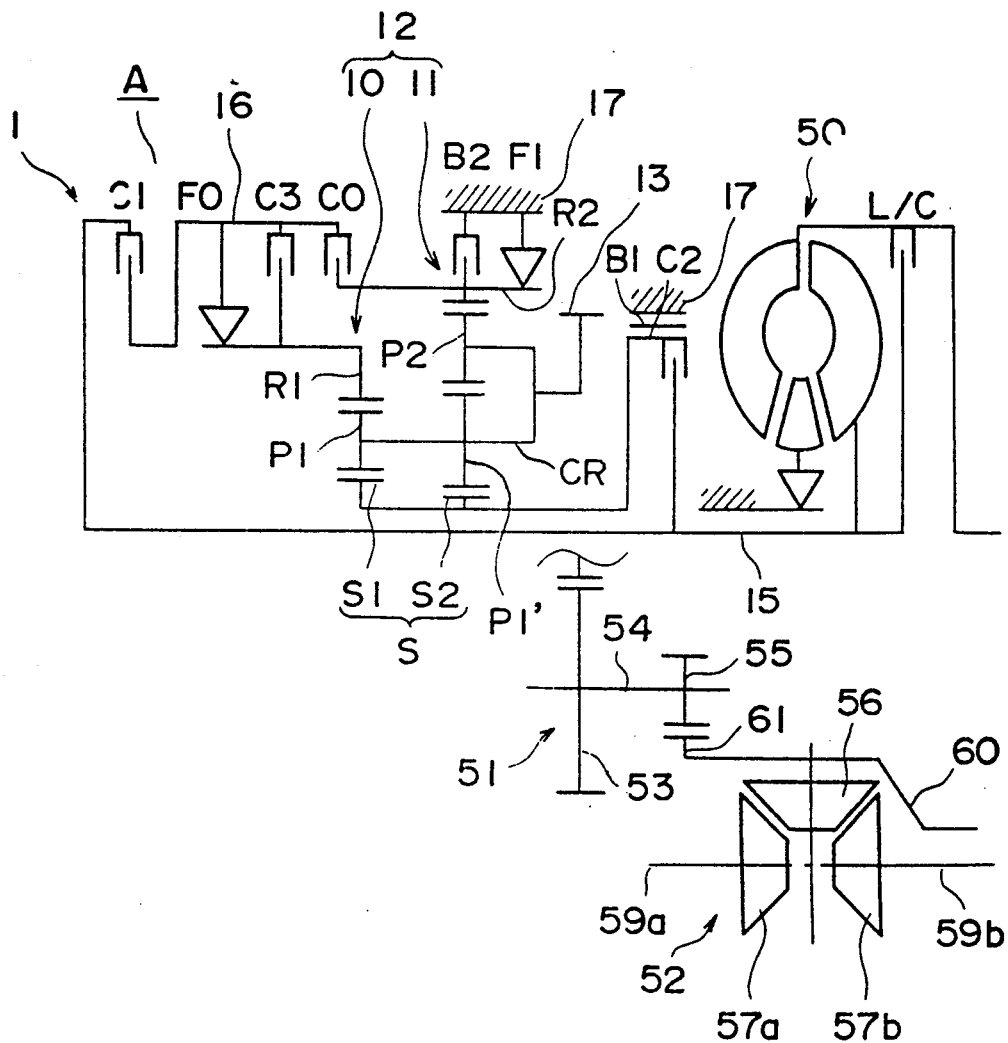
FIG. 2 is a schematic diagram of a shift gear mechanism of the automatic transmission.

As shown in FIG. 2, a four-speed automatic transmission A to which an automatic transmission hydraulic controller in accordance with the present invention is applied has a torque converter 50 having a lock-up clutch L/C, a four-speed shift gear mechanism 1, a reduction gear mechanism 51 and a differential unit 52.

The four-speed shift gear mechanism 1 has a planetary gear unit 12 in which a single planetary gear 10 and a dual planetary gear 11 are connected, and in which sun gears S1 and S2 are formed integrally. For example, the sun gears S1 and S2 have equal numbers of teeth and are formed as one gear S. Pinions P1 and P1' meshing with the sun gears S1 and S2 are also integrally formed of, for example, one long pinion. A carrier CR is also formed integrally on which the pinions P1 and P1' are supported and on which a pinion P2 meshing with a ring gear (hereinafter referred to as "large ring gear") R2 of the dual planetary gear 11 is supported.

An input shaft 15 extending from an output member of the torque converter 50 is connected to a connection member 16 through a first clutch C1 and is also connected to the sun gear S through a second clutch C2. A third clutch C3 and a second one-way clutch F0 are connected between the connection member 16 and a ring gear (hereinafter referred to as "small ring gear") R1 of the single planetary gear 10 A fourth clutch C0 is connected between the connection member 16 and the large ring gear R2. The sun gear S is capable of being restrained by a first brake B1 which comprises a band brake. A second brake B2 and a first one-way clutch F1 are connected between the large ring gear R2 and a case. The carrier CR is connected to an output gear 13 which is positioned generally at the center of the four-speed shift gear mechanism 1.

The first brake B1 has a large restraining force based on its self-boosting force against rotation in a self-binding direction A, but has a comparatively small restraining force against rotation in an unbinding direction B opposite to the self-binding direction A. The first brake B1 serves to achieve a predetermined transmission speed (e.g., second speed) by restraining rotation in the self-binding direction A and to achieve another transmission speed (e.g., fourth speed) by restraining rotation in the unbinding direction B.

The reduction gear mechanism 51 has a counter shaft 54 rotatably supported on the case. Large and small gears 53 and 55 constantly meshing with the output gear 13 are fixed to the shaft 54. The differential unit 52 has a differential pinion 56, and left and right side pinions 57a and 57b which mesh with each other and which are fixed to the left and right front axles 59a and 59b. A differential carrier 60 which supports the differential pinion 56 is rotatably supported on the case. A ring gear 61 is attached to the differential carrier 60 to always mesh with the small gear 55.

Figure 6:
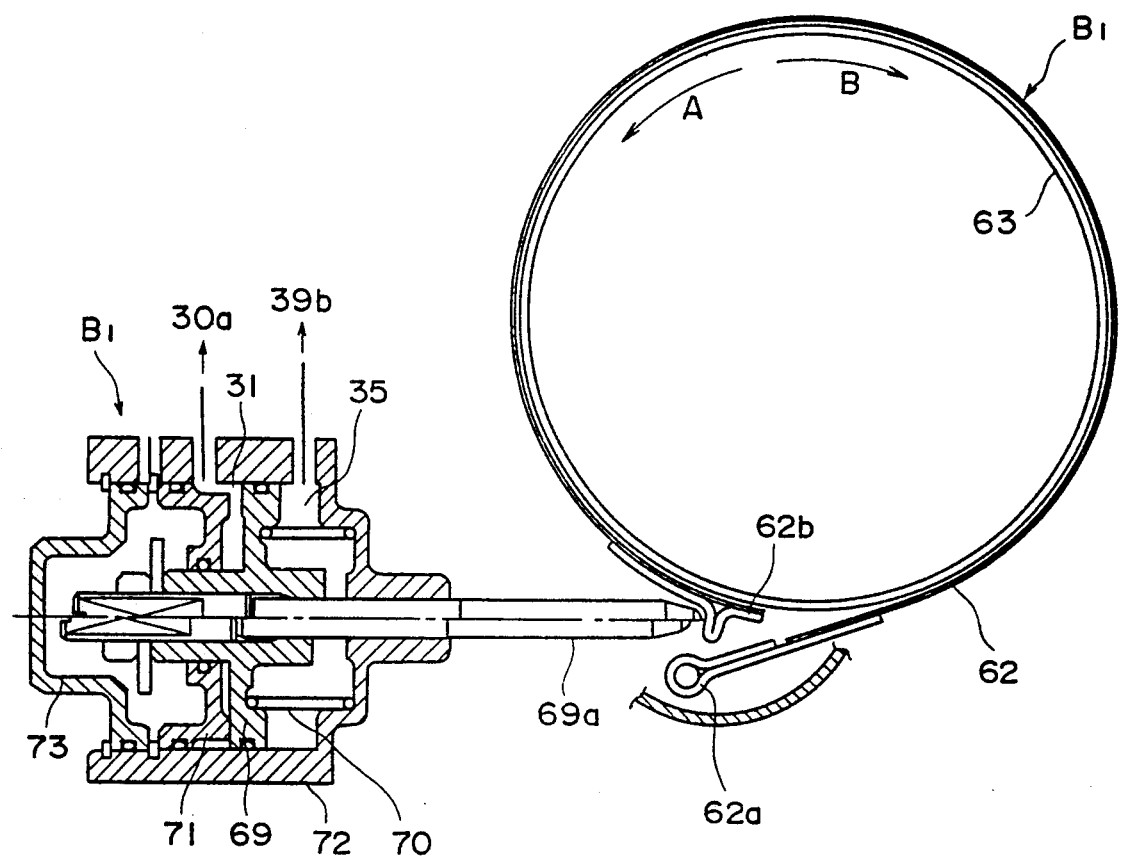
FIG. 6 is a cross-sectional view of the first brake and a hydraulic servo for this brake.

As shown in FIG. 6, the band brake. i.e., the first brake B1 has a band 62 which is connected to the case at its one end 62a. The band 62 is wound around a drum 63 which is integrally connected to the sun gear S. An end 62b of the band 62 is disposed adjacent to a piston rod 69a of a hydraulic servo $B_1$ described later.

Figure 4:
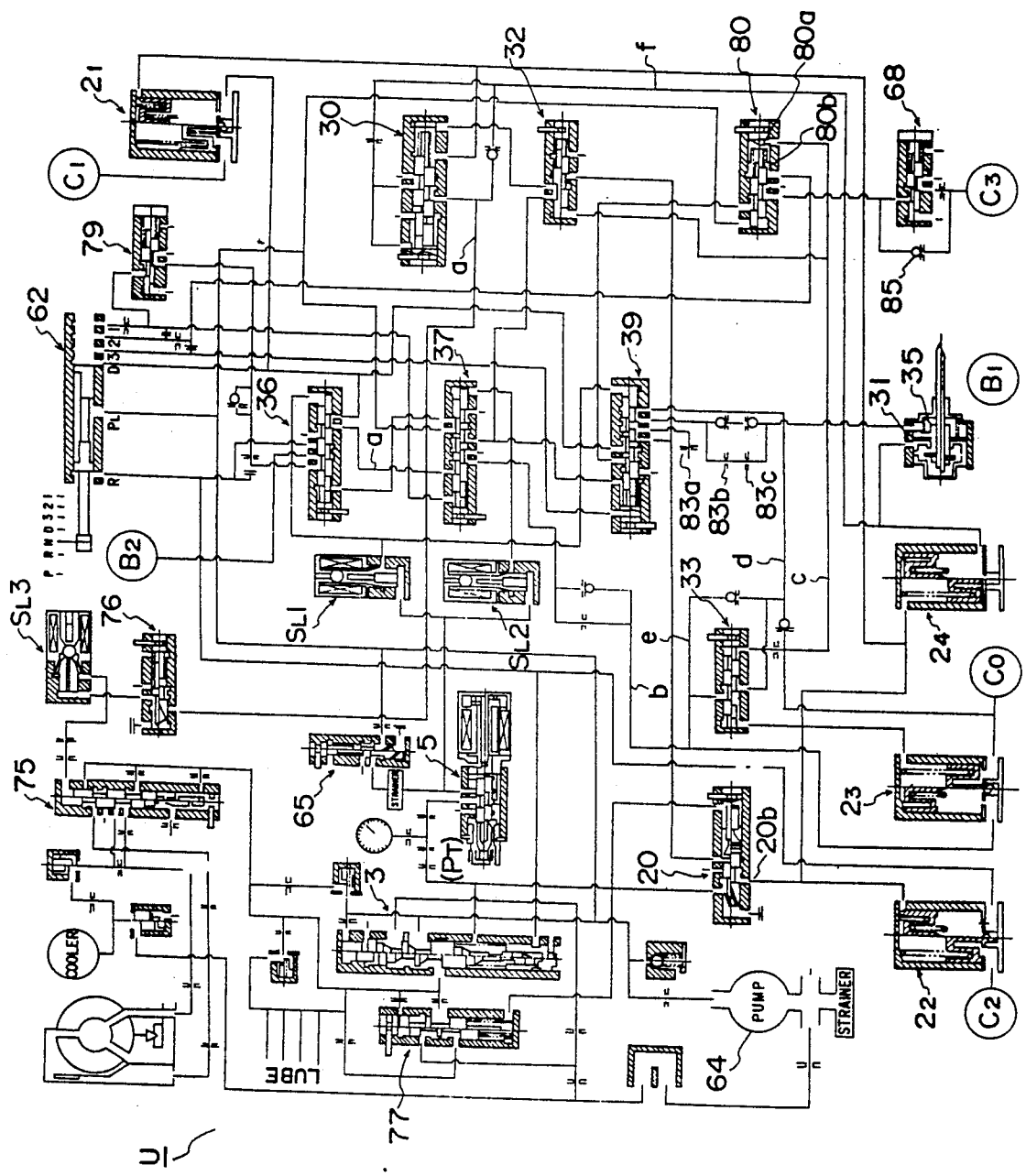
FIG. 4 is a circuit diagram of the whole of the hydraulic controller in accordance with the present invention.

On the other hand, a hydraulic controller U has hydraulic servos $C_1$, $C_2$, $C_3$, $C_0$, $B_1$, and $B_2$ for operating the clutches C1, C2, C3, and C0 and the brakes B1 and B2, respeCtively, as shown in FIG. 4. Accumulators $2_1$, $2_2$, $2_3$, and 24 are disposed in parallel with the hydraulic servo C1 for the first clutch C1, the hydraulic servo C2 for the second clutch C2, the hydraulic servo $C_0$ for the fourth clutch C0, and the hydraulic servo $B_1$ for the first brake B1. A manual valve 62 is operated by the driver to change over oil passages to shift the transmission speed to each speed range. That is, the manual valve 62 is changed over so as to make a line pressure oil passage $P_L$ communicate with a port D for a range D, with the port D and a port 3 for a range 3, with the port D, the port 3 and a port 2 for a range 2, or with a port R for a range R.

A primary regulator valve 3 receives a throttle pressure and hydraulic pressures supplied from the range R port and so on as signal pressures, and suitably controls a hydraulic pressure from an oil pressure source, namely, a pump 64 to produce a line pressure. A throttle pressure control valve 5 which comprises a linear solenoid valve is controlled by an electrical signal based on the throttle opening and other factors to produce a predetermined throttle pressure ($P_T$).

Figure 1:
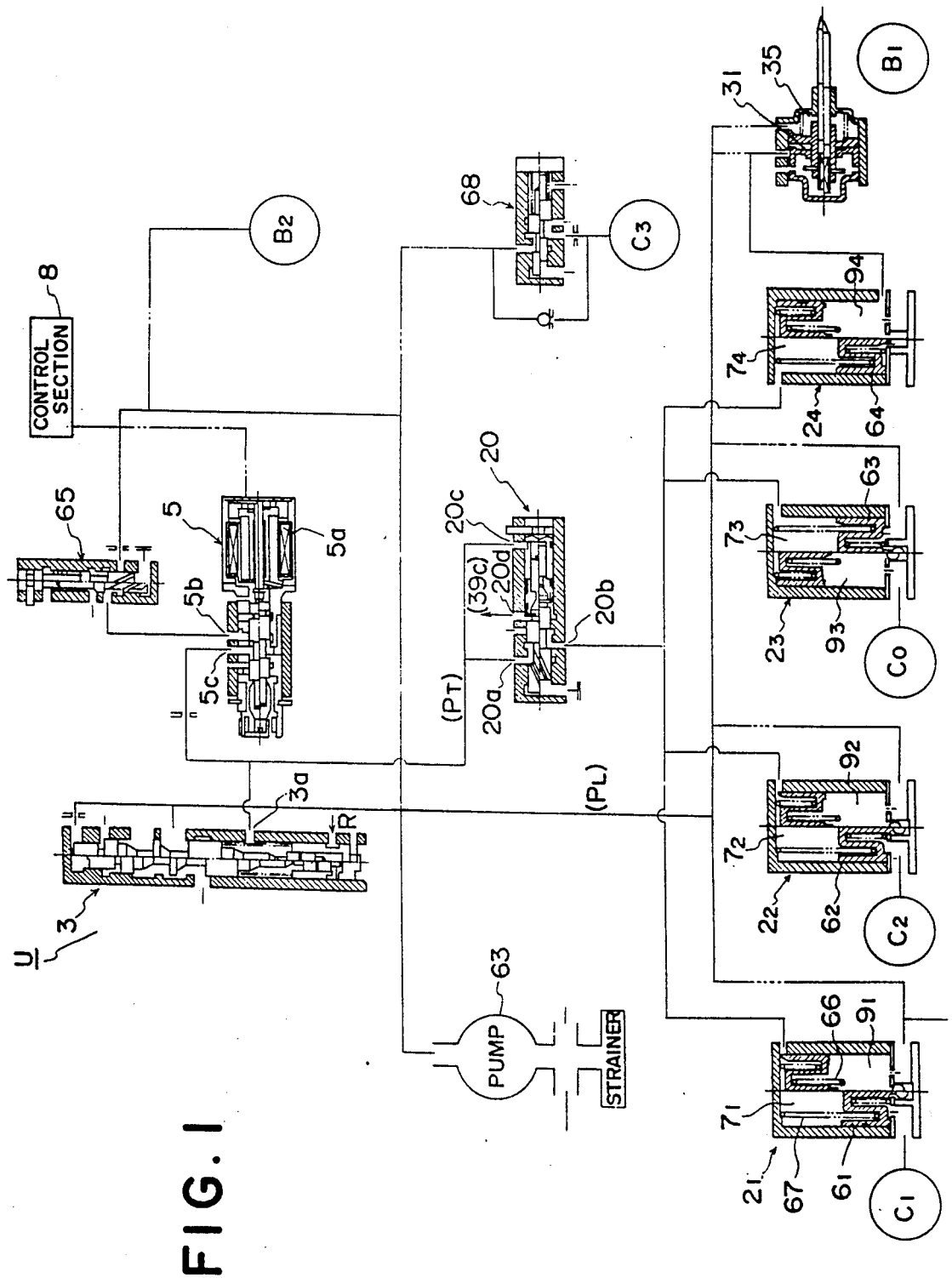
FIG. 1 is a circuit diagram of a hydraulic controller in accordance with the present invention, showing essential components thereof.

As shown in FIG. 1 in detail, a solenoid valve device is provided. The solenoid valve device comprises a throttle pressure control valve 5, a control unit 8 and an accumulator control valve 20. The throttle pressure control valve 5 has a solenoid 5a operated by an electrical signal supplied from the control unit 8, an input port 5b, and an output port 5c. The throttle pressure $P_T$ is supplied from the output port 5c to a throttle pressure port 3a of the primary regulator valve 3 and is also supplied to an input port 20a of the accumulator control valve 20. A solenoid modulator valve 65 serves to supply the line pressure $P_L$ to the input port 5b of the throttle pressure control valve 5 while suitably regulating the line pressure $P_L$. The accumulator control valve 20 has, in addition to the input port 20a, a pressure regulation port 20b, a feedback port 20c and a fourth speed supply port 20d. A hydraulic pressure is supplied from the pressure regulation port 20b to back pressure chambers $7_1$, $7_2$, $7_3$, and $7_4$ of the accumulators $2_1$, $2_2$, $2_3$, and $2_4$. The accumulators $2_1$, $2_2$, $2_3$, and $2_4$ have pistons $6_1$, $6_2$, $6_3$, and $6_4$. In front of the pistons $6_1$, $6_2$, $6_3$, and $6_4$, accumulator chambers $9_1$, $9_2$, $9_3$, and $9_4$ communicating with the respective hydraulic servos are formed and comparatively short springs 66 are disposed. At the back of the pistons $6_1$, $6_2$, $6_3$, and $6_4$, the back pressure chambers $7_1$, $7_2$, $7_3$, and $7_4$ having the same pressure receiving areas as the accumulator chambers $9_1$, $9_2$, $9_3$, and $9_4$ are formed and comparatively long springs 67 are disposed.

All the accumulators $2_1$, $2_2$, $2_3$, and $2_4$ are equal in shape and are constructed by using common identical parts. The third clutch hydraulic servo $B_2$ is connected through a modulator valve 68, and the line pressure $P_L$ is directly supplied to the second brake hydraulic servo $C_3$. Both the hydraulic servos $C_3$ and $B_2$ are connected without intermediation through any accumulator.

Figure 5:
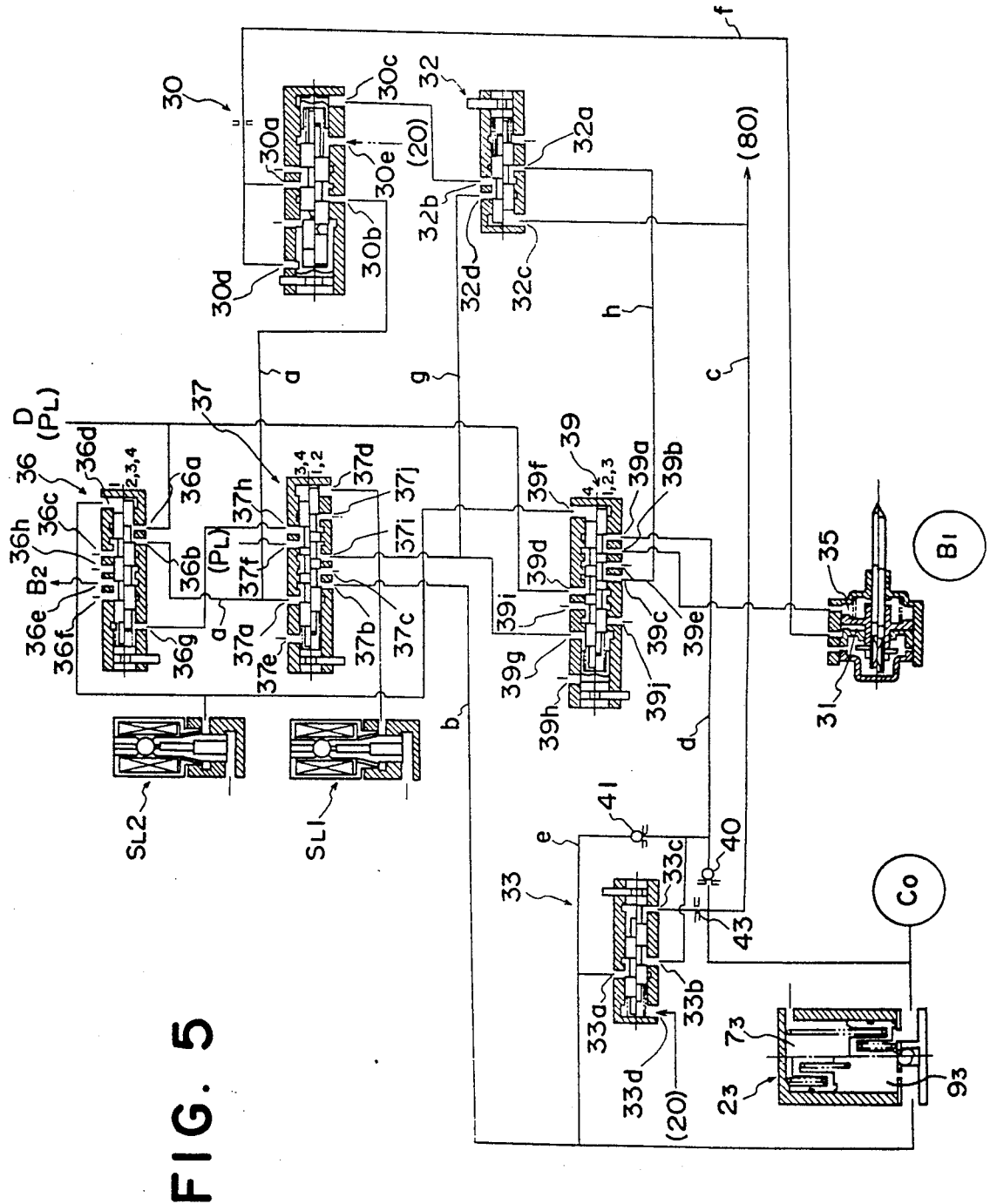
FIG. 5 is a circuit diagram of a part of the hydraulic controller in accordance with the present invention.

As shown in FIG. 5, a shift valve device is provided. The shift valve device comprises a 1-2 shift valve 36, a 2-3 shift valve 37, a 3-4 shift valve 39, a first solenoid valve $S_L1$ and a second solenoid valve $S_L2$. The 1-2 shift valve 36 and the 3-4 shift valve 39 are controlled with the second solenoid valve $S_L2$, while the 2-3 shift valve 37 is controlled with the first solenoid valve $S_L1$. More specifically, the 1-2 shift valve 36 has a control oil chamber 36d to which a control hydraulic pressure is applied from the solenoid valve $S_L2$, a line pressure supply port 36a communicating with the range D port, an output port 36b, a drain port 36c, a $B_2$ port 36e, a low modulator port 36f, an R port 36h, and a restraining control oil chamber 36g. The 1-2 shift valve 36 is changed over to a lower half position when the second, third or fourth speed is selected or to an upper half position when the first speed is selected.

In the lower half position, the 1-2 shift valve 36 provides a communication between the line pressure port 36a and the output port 36b. In the upper half position, it closes the line pressure port 36a and provides a communication between the output port 36b and the drain port 36c.

The 2-3 shift valve 37 has a control oil chamber 37d to which a control hydraulic pressure is applied from the solenoid valve $S_L1$, an input port 37a communicating with an oil passage a extending from the output port 36b of the 1-2 shift valve 36, an output port 37b communicating with the fourth clutch hydraulic servo $C_0$ through an oil passage b, a drain port 37c, a range 1 restraining control oil chamber 37e, a line pressure supply port 37f, a port 37h communicating with the restraining control oil chamber 36g of the 1-2 shift valve 36, a port 37i, and a drain port 37j. The 2-3 shift valve 37 is changed over to a lower half position when the first or second speed is selected or to an upper half position when the third or fourth speed is selected.

In the lower half position, the 2-3 shift valve 37 closes the input port 37a and provides a communication between the output port 37b and the drain port 37c as well as a communication between the line pressure supply port 37f and the port 37j. In the upper half position, it provides a communication between the input port 37a and the output port 37b as well as a communication between the port 37i and the drain port 37c.

The 3-4 shift valve 39 has a control oil chamber 39f to which a control hydraulic pressure is applied from the solenoid valve $S_L2$, a $C_0$ port 39a, a $B_1$ release port 39b, a drain port 39e, a restraining control oil chamber 39g communicating with the port 37i, a range 3 restraining control oil chamber 39h, a $C_3$ port 39i, a drain port 39j. The 3-4 shift valve 39 is changed over to a lower half position when the first, second or third speed is selected or to an upper half position when the fourth speed is selected.

In the lower half position, the 3-4 shift valve 39 provides a communication between the port 39a communicating with the fourth clutch hydraulic servo $C_0$ and the port 39b as well as a communication between the port 39c communicating with the second input port 32a and the drain port 39e. In the upper half position, it closes the port 39a communicating with the fourth clutch hydraulic servo $C_0$ and provides a communication between the port 39b communicating with the brake releasing oil chamber 35 and the drain port 39e as well as a communication between the line pressure supply port 39d and the port 39c.

A $B_1$ modulator valve 30 also shown in FIG. 5 has a line pressure supply port 30b communicating with the oil passage a extending from the output port 36b of the 1-2 shift valve 36, a pressure modulation port 30a, a feedback port 30d, a restraining control oil chamber 30c, and another control oil chamber 30e communicating with the pressure regulation port 20b of the accumulator control valve 20. When set in a position such that no control pressures are applied to the control oil chambers 30c and 30e, the $B_1$ modulator valve 30 reduces the line pressure supplied through the line pressure supply port 30b at a predetermined rate and outputs the reduced pressure through the pressure modulation port 30a.

That is, the modulator valve 30 reduces the line pressure $P_L$ to produce a predetermined modulator pressure. When the pressure modulation port 30a of the modulator valve 30 communicates with a brake restraining hydraulic chamber 31 of the first brake hydraulic servo $B_1$, the modulator pressure is applied to the brake restraining hydraulic chamber 31. At this time, the first brake $B_1$ is restrained with respect to the self-binding direction A but is not restrained with respect to the unbinding direction B. As mentioned above, the modulator valve 30 has the line pressure supply port 30b, the pressure modulation port 30a, the feedback port 30d and the restraining control oil chamber 30c, and enables an intermediate transmission speed (e.g., a third speed) to be set between the predetermined transmission speed (e.g., a second speed) achieved by restraining rotation in the self-binding direction A and the other transmission speed (e.g., a fourth speed) achieved by restraining rotation in the unbinding direction B. That is, the arrangement is such that the restraining hydraulic pressure is supplied to the restraining control oil chamber 30c when the predetermined transmission speed (second speed) or the other transmission speed (fourth speed) is selected, and that the supply of this restraining hydraulic pressure is stopped when the intermediate transmission speed (third speed) is selected. The modulator valve 30 makes the line pressure supply port 30b and the pressure modulation port 30a directly communicate with each other to supply the line pressure when the predetermined transmission speed or the other transmission speed is selected, or produces the modulator pressure at the pressure modulation port 30a when the intermediate transmission speed is selected.

The transmission has a frictional engagement element, e.g., the fourth clutch $C_0$, which is retained in an engaging state when the other transmission speed (fourth speed) and the intermediate transmission speed (third speed) is selected, and the hydraulic servo $C_0$ for operating this frictional engagement element.

The modulator valve 30 also has the control oil chamber 30e to which hydraulic pressure is applied from the throttle pressure control valve 5 (refer to FIG. 4), as well as the line pressure supply port 30b, the pressure modulation port 30a, the feedback port 30d and the restraining control oil chamber 30c.

Further, a $B_1$ modulator control valve 32 is provided which has a first input port 32d communicating with an oil passage g extending from the port 37i of the 2-3 shift valve 37, a second input port 32a communicating with an oil passage h extending from the port 39c of the 3-4 shift valve 39, an output port 32b communicating with the restraining control oil chamber 30c of the $B_1$ modulator valve 30, and a control oil chamber 32c communicating with the hydraulic servo $C_0$ through an oil passage c. When no hydraulic pressure is supplied to the control oil chamber 32c, the $B_1$ modulator control valve 32 provides a communication between the first input port 32d and the output port 32b and a communication between the control oil chamber 32c and the fourth clutch hydraulic servo $C_0$. When hydraulic pressure is supplied to the control oil chamber 32c, the modulator control valve 32 is held in a position such as to provide a communication between the second input port 32a and the output port 32b and, hence, to enable a hydraulic pressure communication with the restraining control oil chamber 30c of the modulator valve 30.

A 2-3 timing valve 33 is inserted in a passage branching off from the oil passage b for communication between the output port 37b of the 2-3 shift valve 37 and the fourth clutch hydraulic servo $C_0$. The 2-3 timing valve 33 has an input port 33a communicating with the output port 37b of the 2-3 shift valve 37, an output port 33b communicating with the port 39a of the 3-4 shift first control oil chamber 33c communicating with the hydraulic servo $C_0$ through an orifice 43, and a second control oil chamber 33d to which a hydraulic pressure is applied from the throttle pressure control valve 5. When the hydraulic pressure of the hydraulic servo $C_0$ is increased to a predetermined level, the input port 33a and the output port 33b communicate with each other. A check ball 40 which allows a flow from the hydraulic servo $C_0$ to the port 39b of the 3-4 shift valve 39 is inserted in an oil passage d for communication between the hydraulic servo $C_0$ and the port 39b of the 3-4 shift valve 39. Another check ball 41 which allows oil discharge from the port 39a to the port 37b is inserted in an oil passage e for communication between the oil passage d and the oil passage b.

As shown in FIG. 6, the first brake hydraulic servo $B_1$ has a piston 69 fitted in a cylinder case 72 in an oil tight manner. A brake releasing hydraulic chamber 35 is formed between one side of the piston 69 and the case 72, and a return spring 70 is set therein in a compressed state.

An end plate 71 is fitted between a piston boss portion and the case in an oil tight manner while being inhibited from moving in the axial direction. A brake engaging hydraulic chamber 31 is defined between the end plate 71 and the other side of the piston 69. The cylinder case 72 is closed at its one end by a cover 73. The rod 69a fixed to the piston 69 projects outward at the other end of the case 72 and abuts against the end 62b of the band 62 of the first brake B1. The brake releasing hydraulic chamber 35 communicates with the port 39b of the 3-4 shift valve 39, and the brake engaging hydraulic chamber 31 communicates with the pressure modulation port 30a of the $B_1$ modulator valve 30 through an oil passage f.

Referring back to FIG. 4, the hydraulic controller U also has a lock-up clutch control valve 75, a lock-up clutch modulator valve 76, and a lock-up clutch control solenoid valve $S_L3$ which are controlled as desired for transmission speeds designated by double circles in FIG. 4, and a secondary regulator valve 77, a low modulator valve 79, and a C3 timing valve.

According to the above-described arrangement, when the transmission is shifted to a predetermined speed, one of the multiplicity of frictional engagement elements is changed over to an engaged state, while the other engagement elements are not changed over to an engaged state.

At this time, an engine output pressure (e.g., the throttle pressure $P_T$) from an engine output control valve such as a linear solenoid valve (e.g., the throttle pressure control valve 5) is supplied to the back pressure chambers $7_1$, $7_2$, $7_3$, and $7_4$ of the accumulators $2_1$, $2_2$, $2_3$, and $2_4$ while being controlled with the accumulator control valve 20. The line pressure $P_L$ is thereby applied to the accumulator chamber $9_1$ of the accumulator $2_1$ communicating with the hydraulic servo $C_1$ for operating the frictional engagement element (e.g., the first clutch C1) which is to be changed over, while the hydraulic pressure based on the engine output pressure is applied to the back pressure chamber $7_1$ having substantially the same pressure receiving area as that of the accumulator chamber $9_1$, thereby smoothly engaging the frictional engagement element.

During this operation, the engine output control valve controlled by an electrical signal supplied from the control section 8 effects suitable pressure regulation according to the engaging characteristics of the frictional engagement element to be changed over, and supplies the regulated hydraulic pressure to the accumulator chamber $7_1$, thereby smoothly engaging the frictional engagement element.

When the engine output pressure control valve is operated for pressure regulation, the primary regulator valve 3 is also controlled to change the line pressure $P_L$. At this time, however, the other frictional engagement elements are not changed over to an engaged state. That is, there is no influence upon the operating state of each of the other frictional engagement elements even if the line pressure $P_L$ is changed.

This hydraulic control is effected with respect to the accumulators $2_1$, $2_2$, $2_3$, and $2_4$ having the back pressure chambers $7_1$, $7_2$, $7_3$, and $7_4$. That is, when one of the clutches C1, C2, and $C_0$ and the brake B1 is changed over from a released state to an engaged state, the others are not changed over from a released state to an engaged state.

That is, when the manual valve 62 is operated from the range N position to the range D (or one of the other forward range positions), the hydraulic servo $C_1$ for the first clutch C1 is supplied with hydraulic pressure, but the other clutches C2, C3, and C0 and the brakes B1 and B2 are in the released state and the corresponding hydraulic servos $C_1$, $C_2$, $C_3$, $C_0$, $B_1$, and $B_2$ are in drained states (first-speed forward state).

At this time, the throttle pressure control valve 5 comprising a linear solenoid valve effects suitable pressure regulation to produce a throttle pressure and supplies a hydraulic pressured based on the throttle pressure to the back pressure chambers $7_1$, $7_2$, $7_3$, and $7_4$ of the accumulators $2_1$, $2_2$, $2_3$, and $2_4$. The first clutch C1 is smoothly engaged in accordance with its engaging characteristics.

At this time also, the primary regulator valve 3 changes the line pressure $P_L$ based on the control of the throttle pressure $P_T$. However, all the other frictional engagement elements C2, C3, C0, B1, and B2 are in the released states and there is no possibility of the change in the line pressure $P_L$ influencing the frictional engagement elements C2, C3, and C0.

When the transmission is up-shifted from the first forward speed to the second forward speed, the first brake B1 as well as the first clutch C1 is changed over to the engaged state, while the clutches C3 and C0 and the brake B2 are maintained in the released state. For this operation also, hydraulic pressure is supplied to the brake engaging hydraulic chamber 31 of the first brake hydraulic servo $B_1$, and the throttle pressure control valve 5 is suitably controlled in accordance with the engaging characteristics of the first brake B1. Hydraulic pressure based on the regulated throttle pressure is supplied to the back pressure chambers $7_1$, $7_2$, $7_3$, and $7_4$ of the accumulators $2_1$, $2_2$, $2_3$, and $2_4$. The first brake B1 is smoothly engaged in accordance with its engaging characteristics.

At this time, the line pressure $P_L$ is also changed by the control of the throttle pressure $P_T$. However, since the first clutch C1 is in a static frictional state to maintain the frictional plates in an engaged state, this engaged state is maintained and the throttle pressure is controlled within a range for maintaining the engaged state, even if the line pressure $P_L$ applied to the hydraulic servo C1 is reduced.

Figure 7:
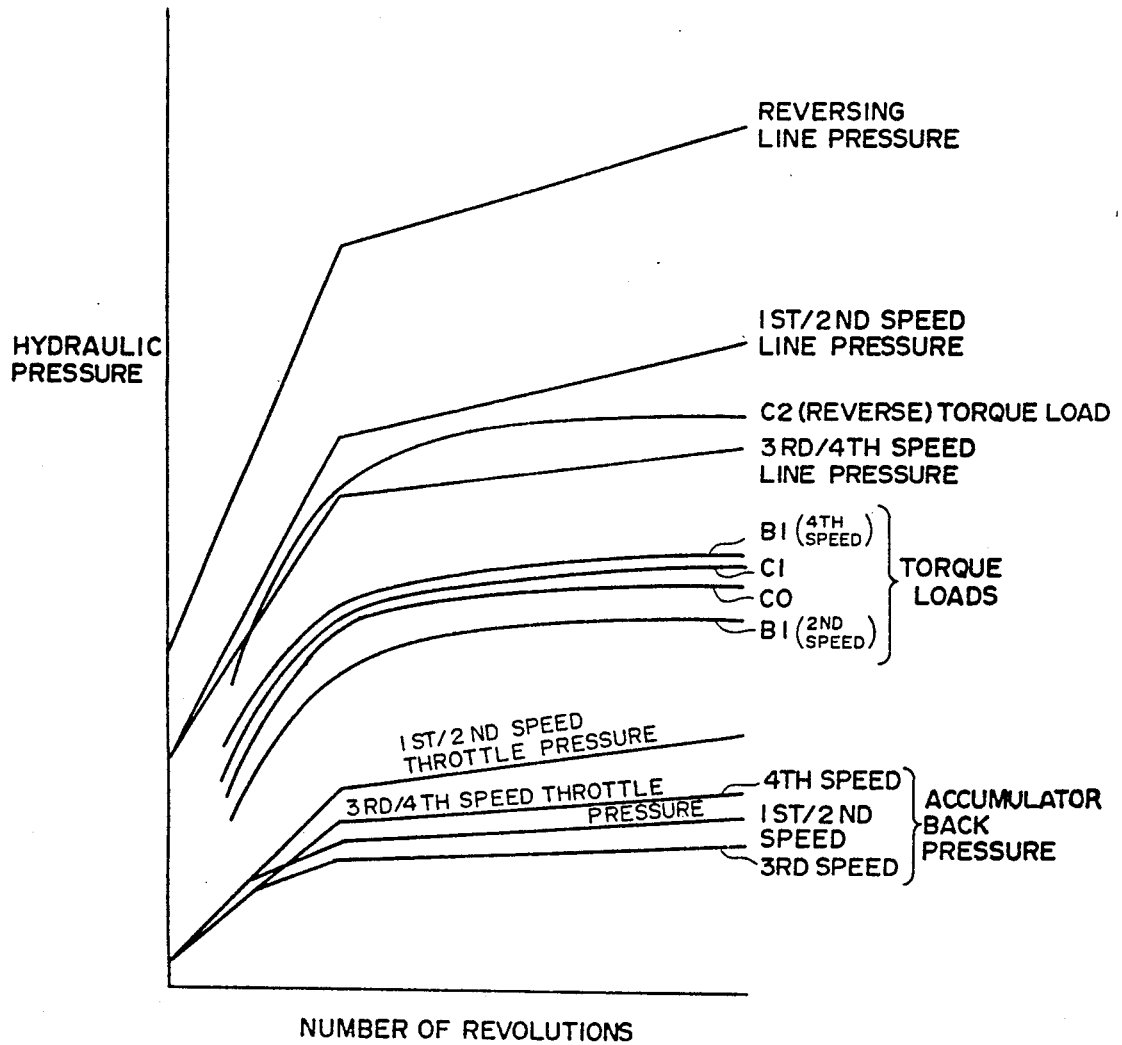
FIG. 7 is a graph of hydraulic pressures applied to hydraulic servos and accumulator back pressure chambers with respect to the number of revolutions.

That is, as shown in FIG. 7, the line pressure $P_L$ for the first or second speed is set to a substantially high level in comparison with the hydraulic pressure corresponding to the torque load of the first clutch C1. Accordingly, the engagement of the first clutch C1 is maintained even if the throttle pressure control valve 5 is controlled to produce an accumulator back pressure in accordance with the engaging characteristics of the first brake B1, resulting in a reduction in the throttle pressure.

Similarly, only the fourth clutch C0 is changed over to the engaged state at the time of up-shifting from the second forward speed to the third forward speed, and only the first brake B1 is changed over to the engaged state at the time of up-shifting from the second forward speed to the third forward speed. For each shift, the throttle pressure valve 5 is controlled according to the engaging characteristics of the corresponding engagement element.

When the transmission is shifted to the range R, the throttle pressure control valve 5 is controlled according to the engaging characteristics of the second clutch C2.

The throttle pressure control valve 5 is controlled according to the engagement characteristics of the fourth clutch C0 when the transmission is up-shifted from the first speed to the third speed. It is also controlled according to the engagement characteristics of the fourth clutch C0 when the transmission is shifted from the second speed to the fourth speed.

The operation of this embodiment will be described below in more detail with respect to each transmission speed.

When the first speed is selected while the manual valve 62 is operated to set the range D, only the first solenoid valve $S_L 1$ is turned on for draining while the second solenoid valve $S_L 2$ is in the off state, i.e., in the supply state, as shown in FIG. 3. In this state, hydraulic pressure is supplied to the control oil chamber 36d of the 1-2 shift valve 36 to set this valve in the upper half position while the hydraulic pressure in the control oil chamber 37d of the 2-3 shift valve 37 is released to set this valve in the lower half position. Hydraulic pressure is supplied to the control oil chamber 39f of the 3-4 shift valve 39, but this valve is restrained in the lower half position because the line pressure $P_L$ from the line pressure supply port 37f of the 2-3 shift valve 37 is supplied to the restraining control oil chamber 39g.

Consequently, the line pressure from the range D port D of the manual valve 62 is supplied to the first clutch hydraulic servo $C_1$ alone, and the other hydraulic servos are supplied with no hydraulic pressure.

At this time, the throttle valve 5 is suitably operated on the basis of a signal sent from the control unit 8 to produce the predetermined throttle pressure $P_T$, as shown in FIG. 1. Further, the throttle pressure $P_T$ is supplied to the input port 20a of the accumulator control valve 20 and is reduced at the predetermined rate by the effect of the feedback pressure, and the reduced pressure is supplied to the back pressure chambers $7_1$, $7_2$, $7_3$, and $7_4$ of the accumulators $2_1$, $2_2$, $2_3$, and $2_4$ through the output port 20b. The hydraulic pressure suitably controlled by the throttle pressure control valve 5 based on the engaging characteristics of the first clutch C1 is transmitted to the back pressure chamber $7_1$ of the accumulator $2_1$ communicating with the hydraulic servo $C_1$, thereby smoothly engaging the first clutch C1.

By the control operation of the throttle pressure control valve 5, the line pressure from the primary regulator valve 3 and the pressures in the back pressure chambers $7_2$, $7_3$, and $7_4$ of the other hydraulic servos $2_2$, $2_3$, and $2_4$ are also modulated, but other clutches C2, C3, and C0 and the brakes B1 and B2 are not influenced since they are in disengaged states.

In the first speed state in which the first clutch C1 is engaged and in which the first and second one-way clutches F1 and F0 are also engaged, the torque of the input shaft 15 is transmitted to the small ring gear R1 through the first clutch C1 and the second one-way clutch F0. At this time, since the first one-way clutch F1 inhibits the large ring gear R2 from rotating, the carrier CR rotates at a greatly reduced speed while racing the sun gear S and the drum 63 integral with the sun gear S in the self-binding direction A shown in FIG. 6. The torque of this reduced-speed rotation is extracted through the output gear 13. The torque of the gear 13 is reduced in speed by the speed reduction mechanism 51 and is thereafter transmitted to the left and right axle shafts 59a and 59b by the differential unit 52.

When the second speed is selected, the second solenoid valve $S_L2$ as well as the first solenoid valve $S_L1$ is turned on. Then the 2-3 shift valve 37 and the 3-4 shift valve 39 are held in the lower half positions and the 1-2 shift valve 36 is changed over to the lower half position by hydraulic pressure release from the control oil chamber 36d. In this state, the line pressure $P_L$ from the range D port is supplied to the oil passage a through the line pressure supply port 36a and the output port 36b to be supplied to the line pressure port 30b of the $B_1$ modulator valve 30. In the 2-3 shift valve 37, the line pressure supply port 37f and the port 37i communicate with each other. The line pressure $P_L$ supplied from the line pressure supply port 37f is supplied to the first input port 32d of the $B_1$ modulator control valve 32 via the port 37i and the oil passage g. In the second speed state, therefore, the $B_1$ modulator control valve 32 is in the upper half position and the hydraulic pressure at the input port 32d is supplied to the restraining control oil chamber 30c of the $B_1$ modulator valve 30 through the output port 32b. Accordingly, the $B_1$ modulator valve 30 is restrained in the lower half position and the line pressure $P_L$ at the line pressure supply port 30b is directly output through the pressure modulation port 30a to be supplied to the brake engaging hydraulic chamber 31 of the first brake hydraulic servo $B_1$ through the oil passage f. The piston 69 is thereby extended to press the band end 62, thereby fastening the band 62 of the first brake B1 by a large force based on the line pressure $P_L$. At this time, the sun gear S and the drum 63 integral with the sun gear S are rotating in the self-binding direction A, and the first brake B1 can also stop the sun gear S by the function of self-boosting based on the rotation in the self-binding direction A, even if the fastening force is comparatively small. In this case, however, the first brake B1 firmly stops the sun gear S by the large fastening force based on the line pressure $P_L$.

At the time of up-shifting from the first speed to the second speed, the throttle pressure control valve 5 is suitably operated on the basis of an electrical signal supplied from the control unit 8, and the throttle pressure $P_T$ is regulated by the accumulator control valve 20 and is supplied to the back pressure chambers $7_1$, $7_2$, $7_3$, and $7_4$ of the accumulators $2_1$, $2_2$, $2_3$, and $2_4$, as in the case of the above-described shifting to the range D. The back pressure of the accumulator 24 of the first brake hydraulic servo $B_1$ is thereby controlled suitably according to the engaging characteristics of the first brake B1, thereby smoothly engaging the first brake B1.

At this time, the accumulators $2_1$, $2_2$, and $2_3$ for the clutches C1, C2, and $C_0$ are also back-pressure controlled. However, the second clutch C2 and the fourth clutch $C_0$ are in the released states and are not influenced. With respect to the first clutch C1, the hydraulic pressure of the hydraulic servo $C_1$ changes as the line pressure $P_L$ changes according to the change in the throttle pressure $P_T$. However, the first clutch C1 has already been engaged and maintained in a static friction state, and the engaging hydraulic pressure is at a substantially high level with respect to the torque load of the first clutch C1. There is therefore no risk of slippage of the first clutch C1.

In the second speed state in which the first brake B1 and the second one-way clutch F0 as well as the first clutch C1 are respectively engaged, the torque of the input shaft 15 is transmitted to the small ring gear R1 through the first clutch C1 and the second one-way, clutch F0. At this time, since the sun gear S is stopped by the first brake B1, the torque of the small ring gear R1 is extracted as second speed torque through the carrier CR while racing the large ring gear R2. At the time of shifting from the first speed to the second speed, the first one-way clutch F1 overruns. The present invention is therefore arranged to prevent occurrence of a clutching changeover shift shock.

When the third speed is selected, the second solenoid valve $S_L2$ is maintained in the on state while the first solenoid valve $S_L1$ is changed over to the off state. In this state, the 1-2 shift valve 36 and the 3-4 shift valve 39 are held in the lower half positions, and the 2-3 shift valve 37 is changed over to the upper half position with the control oil chamber 37d supplied with hydraulic pressure. The line pressure $P_L$ in the oil passage a supplied through the ports 36a and 36b of the 1-2 shift valve 36 is thereby introduced into the oil passage b through the input port 37b to be supplied to the fourth clutch hydraulic servo $C_0$ and the accumulator chamber 93 of the accumulator $2_3$. Also, the port 37i of the 2-3 shift valve 37 communicates with the drain port 37d to drain the hydraulic pressure supplied to the first input port 32d of the $B_1$ modulator control valve 32.

The hydraulic pressure supplied to the fourth clutch hydraulic servo $C_0$ is applied to a restraining control oil chamber 80a of a C3 timing valve 80 (refer to FIG. 4) through the oil passage c, so that the C3 timing valve 80 is changed over to the upper half position. Then, the line pressure $P_L$ from the line pressure port 39d of the 3-4 shift valve 39 is supplied to an input port of the C3 timing valve 80 through the port 39i and is further supplied to the third clutch hydraulic servo C3 via an output port of this valve and the modulator valve 68.

When the hydraulic pressure of the fourth clutch hydraulic servo $C_0$ and the accumulator $2_3$ reaches the predetermined level, this hydraulic pressure is applied to the first control oil chamber 33c of the 2-3 timing valve 33. The 2-3 timing valve 33 is thereby changed over to the upper half position and the hydraulic pressure from the oil passage b is rapidly supplied to the oil passage d through the line pressure supply port 33a, the output port 33b and the check valve 40 to be supplied to the brake releasing through the ports 39a and 39b of the 3-4 shift valve 39.

In this state, the hydraulic pressure of the fourth clutch hydraulic servo $C_0$ is applied to the control oil chamber 32c of the $B_1$ modulator control valve 32 through the oil passage c to change over the $B_1$ modulator control valve 32 to the lower half position. In the 3-4 shift valve 39, the port 39c communicates with the drain port 39e. In the $B_1$ modulator control valve 32, the second input port 32a as well as the first input port 32d is in the draining state. Accordingly, the $B_1$ modulator valve 30 is in the pressure modulating state and the line pressure $P_L$ at the line pressure supply port 30b is reduced at the predetermined rate by the effect of the feedback pressure at the feedback port 30d and so on. The modulator pressure thereby produced is applied to the brake engaging hydraulic chamber 31 of the first brake hydraulic servo $B_1$ through the oil passage f. The line pressure $P_L$ applied to the brake releasing hydraulic chamber 35 of the first brake hydraulic servo $B_1$ thereby prevails over the modulator pressure applied to the brake engaging hydraulic chamber 31 to move the piston 69, thereby releasing the band brake B1.

The present invention is arranged to prevent hydraulic pressure from being abruptly supplied to the brake releasing hydraulic chamber 35 by earlier changeover of the 2–3 timing valve based on the increase in the hydraulic pressure of the hydraulic pressure servo $C_0$ communicating with the accumulator 2. There is therefore no risk of the first brake B1 being released before the engagement of the fourth clutch $C_0$ and, hence, no possibility of the transmission being returned to the first speed state even for a very short time.

When the transmission is up-shifted from the second speed to the third speed, the throttle pressure control valve 5 is suitably controlled on the basis of an electrical signal as in the above, the throttle pressure $P_T$ is regulated through the accumulator control valve 20, and the regulated hydraulic pressure is supplied to the back pressure chambers $7_1$, $7_2$, $7_3$, and $7_4$ of the accumulators $2_1$, $2_2$, $2_3$, and $2_4$ and to the second control chamber $33d$ of the 2–3 timing valve 33. The same accumulator back pressure control as that described above based on the operation of the throttle pressure control valve 5 is thereby effected to regulate the hydraulic pressure of the hydraulic servo $C_0$ according to the engaging characteristics of the fourth clutch C0, thereby smoothly engaging the clutch $C_0$. Also, the timing of change-over of the 2–3 timing valve 33 is suitably controlled to correctly effect the fourth clutch C0 engaging timing and the first brake release timing.

Simultaneously, the hydraulic pressure from the output port 20b of the accumulator control valve 20 is supplied to the control oil chamber 30e of the $B_1$ modulator valve 30 to effect pressure modulation therein so that the modulator pressure is increased. The modulated pressure is supplied to the brake releasing hydraulic chamber 31 through the oil passage f to suitably control the brake B1 release timing in association with the control of the timing valve 33.

Even if, at the time of up-shifting from the second speed to the third speed, the timing of hydraulic pressure supply to the brake releasing oil chamber 35 of the first brake hydraulic servo $B_1$ is delayed so that a certain condition appears which allows the fourth speed state in which the fourth clutch C0 and the first brake $B_1$ are temporarily engaged, the first brake B1 allows the drum 63 to slip since the sun gear S rotates in the unbinding direction B in the fourth speed state, and since the capacity of the first brake B1 based on the modulator pressure is insufficient to stop the rotation in the unbinding direction B to establish the fourth speed state. A 2nd→4th→3rd speed shift is thereby prevented during up-shifting from the second speed to the third speed.

In the third speed state in which the third and fourth clutches C3 and C0 as well as the first clutch C1 are engaged while the first brake B1 is released, the torque of the input shaft 15 is transmitted to the small ring gear R1 through the second one-way clutch F0 and the third clutch C3 and is also transmitted to the large ring gear R2 through the fourth clutch C0. Integral rotation such that the planetary gear unit 12 is integrally operated is extracted from the carrier CR through the output gear 13. At this time, clutching changeover between the fourth clutch C0 and the first brake B1 is performed but the above-described suitable timing control is effected to prevent any shift via another transmission speed and, hence, occurrence of a shift shock. Also, the third clutch C3 is simultaneously engaged but the time at which the clutch C3 is engaged may be delayed since the clutch C3 is connected parallel to the second one-way clutch F0.

When the fourth speed is selected, the second solenoid valve $S_L2$ as well as the first solenoid valve $S_L1$ is changed over to the off state. In this state, the 2–3 shift valve 37 is held in the upper half position, and control hydraulic pressure is supplied to the control oil chamber 39f of the 3–4 shift valve 39 to change over this valve to the upper half position. Also, control hydraulic pressure is supplied to the control oil chamber 36d of the 1–2 shift valve 36, but this valve is maintained in the lower half position because the line pressure $P_L$ at the line pressure supply port 37f of the 2–3 shift valve 37 is supplied to the restraining control oil chamber 36g through the port 37h.

The $B_1$ release port 39b of the 3–4 shift valve 39 thereby communicates with the drain port 39e, thereby draining the brake releasing hydraulic chamber 31 of the first brake hydraulic servo $B_1$.

At the third speed, hydraulic pressure is supplied to the $B_1$ control oil chamber 32c of the modulator control valve 32 through the oil passage c on the basis of the oil supply to the fourth clutch hydraulic servo $C_0$, so that the $B_1$ modulator control valve 32 is changed over to the lower half position to provide communication between the second input port 32a and the output port 32b. If in this state the fourth seed is selected, the 3–4 shift valve 39 is changed over to provide communication between the line pressure supply port 39d and the port 39c, and the line pressure $P_L$ is supplied to the restraining control oil chamber 30c of the $B_1$ modulator valve 30 through the ports 39d and 39c and the ports 32a and 32b of the modulator control valve 32 to set the $B_1$ modulator valve 30 in the lower half position, thereby changing over this valve to the line pressure supply state in which the line pressure port 30b and the pressure modulation port 30a communicate with each other. The line pressure $P_L$ from the oil passage a is therefore introduced into the oil passage f via the ports 30b and 30a, and the hydraulic pressure in the brake engaging hydraulic chamber 31 of the first brake hydraulic servo $B_1$ is changed over from the modulator pressure to the line pressure.

At this time, the same electrical control of the throttle pressure control valve 5 as that described above may be effected to control the hydraulic pressure supplied to the back pressure chamber $7_4$ of the accumulator $2_4$ to enable the transmission to be shifted smoothly. In this case, however, the hydraulic pressure of the drain from the brake releasing hydraulic chamber 35 is regulated by means of orifices 83a, 83b, and 83c and so on to control the engagement of the first brake B1, as shown in FIG. 4. Since in this state the sun gear S and the drum 63 integral with the sun gear S rotate in the unbinding direction B (refer to FIG. 6), the self-boosting effect of the brake B1 cannot be maintained when the brake B1 is engaged. However, the line pressure $P_L$ is applied to the brake engaging hydraulic chamber 31 of the hydraulic servo $B_1$, and the capacity of the band brake B1 is large enough to firmly stop the rotation in the unbinding direction B.

In the 3–4 shift valve 39, the C3 timing port 39i communicates with the drain port 39j. The hydraulic pressure of the third clutch hydraulic servo $C_3$ is thereby drained through the ports 39i and 39j of the 3–4 shift valve 39 via the check ball 85 (refer to FIG. 4) and the C3 timing valve 80. In the fourth speed state, the hydraulic pressure at the port 39c is supplied to the port 20d of the accumulator control valve 20 (refer to FIG. 1) to set a substantially high accumulator back pressure (refer to FIG. 7).

In the fourth speed state in which the first clutch C1 and the fourth clutch C0 are in the engaged sates and in which the first brake B1 is changed over to the engaged state while the third clutch C3 is changed over to the released state, the torque of the input shaft 15 is transmitted to the large ring gear R2 through the fourth clutch C0. Since the sun gear S is stopped by the first brake B1, the large ring gear R2 rotates the carrier CR at a high speed while racing the small ring gear R1. The torque of the carrier CR is transmitted to the output gear 13.

During this operation, the first brake B1 is engaged while the third clutch C3 is released. Even if the third clutch C3 is released by advanced timing, the third speed state can be maintained by the second one-way clutch F0. Consequently, the engagement of the first brake B1 is controlled by means of the orifices 83a, 83b, and 83c and so on so as to slightly delay the engaging timing, thereby preventing occurrence of a shift shock owing to clutching changeover.

When the transmission is down-shifted from the fourth speed to the third speed, the 3-4 shift valve 39 is changed over to the lower half position, as mentioned above. The hydraulic pressure in the oil passage b is thereby supplied to the brake releasing hydraulic pressure chamber 35 of the first brake hydraulic servo $B_1$ through the ports 39a and 39b, and the line pressure $P_L$ at the line pressure supply port 39d is supplied to the third clutch hydraulic servo $C_3$ via the port 39i, the C3 timing valve 80 and the $C_3$ modulator valve 68. At this time, the release hydraulic pressure supplied to the brake releasing hydraulic chamber 35 of the hydraulic servo $B_1$ is controlled by means of the orifices 83b and 83c and so on, and the second one-way clutch F0 is thereby changed over from the overrun state to the engaged state, thereby enabling the transmission to be shifted smoothly.

When the transmission is down-shifted from the third speed to the second speed, the 2-3 shift valve 37 is changed over to the lower half position to provide communication between the $C_0$ port 37b and the drain port 37c, as mentioned above. Then, the hydraulic pressure in the brake releasing hydraulic chamber 35 of the first brake hydraulic servo $B_1$ is first drained through the drain port 37c via the ports 39a and 39b, the oil passage d, the check ball 41, the oil passage e and the port 37c, and the hydraulic pressure of the third clutch hydraulic servo $C_0$ is drained through the oil passage b and the drain port 37c along with the hydraulic pressure in the accumulator chamber $9_3$ of the accumulator $2_3$.

The release of the fourth clutch C0 is thereby delayed relative to the engagement of the first brake B1, thereby preventing a shift via the first speed state in which both the fourth clutch C0 and the first brake are released, i.e., a 3rd→1st→2nd speed shift.

Further, there is a possibility of the timing of draining the brake releasing hydraulic chamber 35 of the first brake servo $B_1$ being excessively advanced so that a certain condition appears which allows the fourth speed state in which both the fourth clutch C0 and the first brake $B_1$ are engaged. In such an event, however, since the hydraulic pressure supplied to the restraining control oil chamber 30c of the $B_1$ modulator valve 30 has already been released in the third speed state to output the modulator pressure through the pressure modulation port 30a, and since this modulator pressure has been applied to the brake engaging hydraulic chamber 31 to operate the first brake B1, the capacity of the brake B1 is insufficient for the rotation of the sun gear S in the unbinding direction B in the fourth speed state, thereby preventing establishment of the fourth speed state. The brake B1 firmly stops the rotation of the sun gear S in self-binding direction A at the second speed by the self-boosting effect, thereby establishing the second speed state.

Thus, a 3rd→4th→2nd speed shift as well as the above-described 3rd→1st→2nd speed shift is prevented and the transmission can be down-shifted smoothly.

At the time of down-shifting from the third speed to the second speed, the C3 timing valve 80 is changed over to the lower half position as the hydraulic pressure based on the hydraulic servo $C_0$ is released from the restraining control oil chamber 80a (refer to FIG. 4). The hydraulic pressure of the hydraulic servo $C_3$ is thereby drained through the drain port of the C3 timing valve 80 via the check ball 85.

When the transmission is down-shifted from the second speed to the first speed, the 1-2 shift valve 36 is changed over to the upper half position to provide communication between the output port 36b and the drain port 36c. Accordingly, the hydraulic pressure in the brake engaging hydraulic chamber 31 of the first brake hydraulic servo $B_1$ is drained through the drain port 36c via the oil passage f, the ports 30a and 30b of the modulator valve 30, the oil passage a and the port 36b.

At the time of kick-down from the fourth speed to the second speed, the 3-4 shift valve 39 and the 2-3 shift valve 37 are changed over to the lower half positions. The hydraulic pressure of the fourth clutch hydraulic servo $C_0$ is thereby drained through the drain port 37c via the oil passage b and the port 37b, and the hydraulic pressure in the brake releasing hydraulic oil chamber 35 of the first brake hydraulic servo $B_1$ is drained through the drain port 37c via the ports 39b and 39a, the oil passage d, the check ball 41, the oil passages e and b and the port 37b. At this time, the hydraulic pressure supplied to the control oil chamber 32c of the $B_1$ modulator control valve 32 from the hydraulic servo $C_0$ is released to change over the $B_1$ modulator control valve 32 to the upper half position, and the first input port 32a is drained to temporarily release the restraining pressure in the restraining control oil chamber 30c of the $B_1$ modulator valve 30 so that the $B_1$ modulator valve 30 produces the modulator pressure. However, the line pressure $P_L$ is immediately supplied to the port 32d of the control valve 32 through the port 37i of the 2-3 shift valve 37, and is further supplied to the restraining control oil chamber 30c through the port 32b, thereby restraining the $B_1$ modulator valve 30 in the line pressure supply state. The first brake B1 is therefore maintained in the engaged sate without being temporarily released, and the transmission is down-shifted quickly and smoothly by one operation.

In the case where the manual valve 62 is operated to select the range R, the line pressure $P_L$ from the range R port is supplied to the second clutch hydraulic servo $C_2$ and the accumulator $2_2$ of this servo. At this time, the throttle pressure control valve 5 is suitably controlled on the basis of an electrical signal from the control unit 8, and the hydraulic pressure reduced by the accumulator control valve 20 is supplied to the back pressure chambers $7_1$, $7_2$, $7_3$, and $7_4$ of the accumulators $2_1$, $2_2$, $2_3$, and $2_4$, as in the above. Consequently, the back pressure control of the accumulator $2_2$ is effected to control the hydraulic pressure of the hydraulic servo $C_2$ according to the engaging characteristics of the second clutch C2, thereby enabling the transmission to be smoothly shifted for N→R or D→R changeover.

If, in this reverse range, the vehicle travels at a predetermined speed, e.g., 7 km/h or lower, that is, it is in a substantially stopped state, the 1-2 shift valve 36 is in the lower half position and the line pressure $P_L$ from the range R port is supplied to the second brake hydraulic servo $B_2$ through the ports 36h and 36e.

In the reverse state in which the second clutch C2 and the second brake B2 are respectively engaged, the torque of the input shaft 15 is transmitted to the sun gear S through the second clutch C2, and the torque of the sun gear S is transmitted as a reverse torque to the carrier CR while racing the small ring gear R1 is the reverse direction, since the large gear R2 is stopped by the second brake B2. The reverse torque is extracted through the output gear 13.

If, in the reverse range, the vehicle travels by inertia at a speed higher than the predetermined speed, the first solenoid valve $S_L1$ is turned to change over the 1-2 shift valve 36 to the upper half position. In this state, no hydraulic pressure is supplied to the second brake hydraulic servo $B_2$, and the reverse state is not established.

In the case where the manual valve 62 is operated to select the range 3, the line pressure $P_L$ from the range 3 port is supplied to the restraining control oil chamber 39h of the 3-4 shift valve 39 to restrain the 3-4 shift valve 39 in the lower half position to inhibit this valve from being set in the upper half position, i.e., the fourth speed position.

In the case where the manual valve 62 is operated to the range 2, the line pressure from the range 2 is supplied to the restraining control oil chamber 80b of the C3 timing valve 80 (refer to FIG. 4) to restrain the C3 timing valve 80 in the upper half position, so that the third clutch hydraulic servo $C_3$ is constantly supplied with hydraulic pressure. The input shaft 15 and the small ring gear R1 are thereby connected through the third clutch C3 to effect engine braking by inhibiting inertial running based on overrunning of the second one-way clutch F0 at the time of coasting.

In the case where the manual valve 62 is operated to select the range 1, the line pressure $P_L$ from the range 1 port is supplied to the restraining control oil chamber 37e of the 2-3 shift valve 37 to restrain the 2-3 shift valve 37 in the lower half position to inhibit this valve from being set in the upper half position, i.e., the second/third speed position. The line pressure $P_L$ from the range 1 port is reduced by the low modulator valve 79, and the reduced pressure is supplied to the port 36f of the 1-2 shift valve 36. The 1-2 shift valve 36 is thereby restrained in the first/second speed state. At the first speed, the modulator pressure is supplied to the second brake hydraulic servo $B_2$.

According to the present invention, as described above in detail, the back pressure chambers $7_1$, $7_2$, $7_3$, and $7_4$ of the accumulators $2_1$, $2_2$, $2_3$, and $2_4$ are supplied with hydraulic pressure from the throttle pressure control valve 5, and the accumulators operate on the basis of the difference between this pressure and the line pressure $P_L$ applied to the accumulator chambers $9_1$, $9_2$, $9_3$, and $9_4$. Since the pressure receiving areas of the back pressure chamber and the accumulator chamber of each accumulator are equal, the back surface of each of the pistons $6_1$, $6_2$, $6_3$, and $6_4$ can be simply formed to define the back pressure chamber. The accumulators can therefore have a very simple construction and can be reduced in length in the direction of an axle. Accordingly, the hydraulic controller U and, hence, the automatic transmission A can be reduced in size, thereby improving the performance of the automatic transmission in terms of mounting on a vehicle.

The output pressure control valve 5 controlled by electrical signals is used as a valve having both the functions of controlling the line pressure and of controlling the accumulator back pressures. There is therefore no need for a special electrical control valve for accumulator back pressure control. As a result, the transmission can be reduced greatly in cost, and the size of the transmission can be further reduced.

For a shift of the transmission, only one of the frictional engagement elements C1, C2, C0, and B1 operated by the hydraulic servos communicating with at least two particular ones of accumulators $2_1$, $2_2$, $2_3$, and $2_4$ having back pressure chambers is changed over to the engaged state while the others are not changed over to the engaged states. Accordingly, even if the line pressure is changed by the control of the engine output pressure control valve (throttle control valve) 5 for accumulator back pressure control, there is substantially no possibility of this change in the line pressure influencing the other frictional engagement elements. The control valve 5 supplies an accumulator back pressure suitable for the frictional engagement characteristics of the element to be changed over.

As a result, even though the friction engagement elements C1, C2, C0, and B1 have different engaging characteristics, all the accumulators $2_1$, $2_2$, $2_3$, and $2_4$ can be formed into the same shape, and it is possible to reduce the cost and size of the transmission by sharing accumulators of a common type.

If a throttle pressure control valve comprising a linear solenoid valve is used as the output pressure control valve 5, the accumulator back pressure control at the time of shifting can be effected with accuracy because the linear solenoid valve reduces pulsation of hydraulic pressure during pressure regulation, thereby remarkably reducing shift shocks. It is also possible to prevent pulsation of the line pressure and, hence, occurrence of vibration and rattling of the frictional engagement elements. Thus, the transmission can be improved in terms of reliability.

The present invention is not limited to the above-described embodiments; it is intended to cover all changes and modifications which do not constitute departures from the spirit and scope of the invention.

What we claim is:

1. A hydraulic controller for an automatic transmission having
   a planetary gear unit, and
   a plurality of frictional engagement elements with hydraulic servos which are not engaged simultaneously during shift changes for establishing a plurality of transmission speeds,
said hydraulic controller comprising:
   an oil pressure source,
   a primary regulator valve connected to the oil pressure source for regulating a line pressure,
   a shift valve device provided between the primary regulator valve and the hydraulic servos for supplying a line pressure to the corresponding hydraulic servos of the frictional engagement elements to establish a transmission speed,
   a plurality of accumulators connected to the corresponding hydraulic servos, having back pressure chambers and accumulator chambers, said each of the back pressure chambers including a pressure receiving area substantially equal to that of the corresponding accumulator chamber, and a solenoid valve device provided between the primary regulator valve and the plurality of accumulators for controlling a hydraulic pressure applied to only one of the back pressure chambers of the accumulators.

2. A hydraulic controller for an automatic transmission according to claim 1, said solenoid valve device having a throttle pressure control valve, said throttle pressure control valve including a linear solenoid valve connected to the primary regulator valve for controlling the primary regulator valve to control the line pressure and the hydraulic pressure to said one back pressure chamber in response to an engine output.

3. A hydraulic controller for an automatic transmission according to claim 2, furthermore comprising an accumulator control valve having an input port,
a feedback port, and
a pressure regulation port, said input port being supplied with a throttle pressure from the throttle control valve, said back pressure chambers of the accumulators being supplied with a hydraulic pressure produced by reducing the throttle pressure by a predetermined amount and output through the pressure regulation port.

* * * * *